US012666026B2

(12) United States Patent
Leleannec et al.

(10) Patent No.: US 12,666,026 B2
(45) Date of Patent: Jun. 23, 2026

(54) FLEXIBLE ALLOCATION OF REGULAR BINS IN RESIDUAL CODING FOR VIDEO CODING

(71) Applicant: InterDigital Madison Patent Holdings, SAS, Paris (FR)

(72) Inventors: Fabrice Leleannec, Mouazé (FR); Antoine Robert, Mézières sur Couesnon (FR); Ya Chen, Rennes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 301 days.

(21) Appl. No.: 17/438,040

(22) PCT Filed: Mar. 6, 2020

(86) PCT No.: PCT/US2020/021281
§ 371 (c)(1),
(2) Date: Sep. 10, 2021

(87) PCT Pub. No.: WO2020/185530
PCT Pub. Date: Sep. 17, 2020

(65) Prior Publication Data
US 2022/0150501 A1 May 12, 2022

(30) Foreign Application Priority Data

Mar. 12, 2019 (EP) ..................................... 19305292
May 21, 2019 (EP) ..................................... 19305645
May 23, 2019 (EP) ..................................... 19305649

(51) Int. Cl.
*H04N 7/12* (2006.01)
*H04N 19/124* (2014.01)
(Continued)

(52) U.S. Cl.
CPC ........... *H04N 19/13* (2014.11); *H04N 19/124* (2014.11); *H04N 19/132* (2014.11);
(Continued)

(58) Field of Classification Search
CPC .... H04N 19/13; H04N 19/124; H04N 19/132; H04N 19/157; H04N 19/172;
(Continued)

(56) References Cited

U.S. PATENT DOCUMENTS

2008/0151998 A1    6/2008   He
2010/0220783 A1    9/2010   Mallat et al.
(Continued)

FOREIGN PATENT DOCUMENTS

CN    103733622 A    4/2014
CN    104272735 A    1/2015
(Continued)

OTHER PUBLICATIONS

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.
(Continued)

*Primary Examiner* — Gims S Philippe
(74) *Attorney, Agent, or Firm* — Condo Roccia Koptiw LLP

(57) ABSTRACT

In at least one embodiment, a method and apparatus for encoding/decoding a video is based on a CABAC coding of bins where a high-level constraint on the maximum usage of regular CABAC coding of bins is enforced. In other words, a budget of regular coded bins is allocated over a picture area that is larger than a coding group, thus covering a
(Continued)

plurality of coding groups, and which is determined from an average allowed number of regular bins per unit of area.

12 Claims, 26 Drawing Sheets

(51) Int. Cl.

| | |
|---|---|
| *H04N 19/13* | (2014.01) |
| *H04N 19/132* | (2014.01) |
| *H04N 19/157* | (2014.01) |
| *H04N 19/172* | (2014.01) |
| *H04N 19/176* | (2014.01) |
| *H04N 19/18* | (2014.01) |
| *H04N 19/60* | (2014.01) |
| *H04N 19/70* | (2014.01) |

(52) U.S. Cl.
CPC ......... *H04N 19/157* (2014.11); *H04N 19/172* (2014.11); *H04N 19/176* (2014.11); *H04N 19/18* (2014.11); *H04N 19/60* (2014.11); *H04N 19/70* (2014.11)

(58) Field of Classification Search
CPC ...... H04N 19/176; H04N 19/18; H04N 19/60; H04N 19/70; H04N 19/127; H04N 19/156; H04N 19/42; H04N 19/91; H04N 19/44
USPC ...................................... 375/240.03
See application file for complete search history.

(56) References Cited

U.S. PATENT DOCUMENTS

| | | | |
|---|---|---|---|
| 2013/0182757 A1 | 7/2013 | Karczewicz et al. | |
| 2014/0307789 A1* | 10/2014 | Kim ....................... | H04N 19/52 |
| | | | 375/240.12 |
| 2016/0080749 A1 | 3/2016 | He et al. | |
| 2016/0330479 A1* | 11/2016 | Liu ....................... | H04N 19/176 |
| 2017/0064336 A1 | 3/2017 | Zhang et al. | |
| 2018/0176581 A1 | 6/2018 | Huang et al. | |
| 2020/0068206 A1* | 2/2020 | Hsiang ................... | H04N 19/70 |
| 2020/0244995 A1* | 7/2020 | Hsiang ................... | H04N 19/13 |
| 2020/0267412 A1* | 8/2020 | Karczewicz ........... | H04N 19/70 |
| 2021/0337235 A1* | 10/2021 | Choi ..................... | H04N 19/129 |
| 2022/0116617 A1* | 4/2022 | Yoo ....................... | H04N 19/134 |
| 2024/0146964 A1* | 5/2024 | Choi ..................... | H04N 19/18 |

FOREIGN PATENT DOCUMENTS

| | | |
|---|---|---|
| CN | 107710759 A | 2/2018 |
| EP | 2805487 A1 | 11/2014 |
| WO | 2012172114 A1 | 12/2012 |
| WO | 2016123488 A1 | 8/2016 |
| WO | 2019/027074 A1 | 2/2019 |
| WO | 2019029951 A1 | 2/2019 |

OTHER PUBLICATIONS

Anonymous, "Information technology—Generic coding of moving pictures and associated audio information: Systems", International Telecommunication Union, ITU-T Telecommunication Standardization Sector of ITU, Series H: Audiovisual and Multimedia Systems—Infrastructure of audiovisual services—Transmission multiplexing and synchronization, Recommendation ITU-T H.222.0, Jun. 2012, 228 pages.

Bross et al., "CE8: Residual Coding for Transform Skip Mode (CE8-4.3a, CE8-4.3b, CE8-4.4a, and CE8-4.4b)", Joint Video Experts Team (JVET) of ITU-T SG 16 WP 3 and ISO/IEC JTC 1/SC 29/WG 11, Document JVET-N0280, 14th Meeting: Geneva, Switzerland, Mar. 19, 2019, 4 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1, 7th Meeting: Torino, Italy, Jul. 13, 2017, 48 pages.

Albrecht et al., "Description of SDR, HDR, and 360° video coding technology proposal by Fraunhofer HHI", Joint Video Experts Team (JVET) of ITU-T SG 16 WP 3 and ISO/IEC JTC 1/SC 29/WG 11 Document JVET-J0014-v4, 10th Meeting: San Diego, United States, Apr. 10, 2018, 122 pages.

Sullivan et al., "JVET Ad hoc group report: Project management", Joint Video Experts Team (JVET) of ITU-T SG 16 WP3 and ISO/IEC JTC 1/SC 29/WG 11, Document: JVET-M0001-v1, 13th Meeting: Marrakech, Morrocco, Jan. 9, 2019, 3 pages.

Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, Document JVET-M1002-v1, 13th Meeting: Marrakech, Morrocco, Jan. 9, 2019, 60 pages.

Anonymous, "Reference software for ITU-T H.265 high efficiency video coding", InternationalUnion, ITU-T Telecommunication Standardization Sector of ITU, Series H: Audiovisual andInfrastructure of audiovisual services—Coding of moving video, Recommendation ITU-T H.265.2, 12 pages.

Chen et al., "Algorithm Description for Versatile Video Coding and Test Model 4 (VTM 4)", JVET-M1002-V2, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, 62 pages.

Nguyen et al., "Transform Coding Techniques in HEVC", IEEE Journal of Selected Topics in Signal Processing, vol. 7, No. 6, Dec. 2013, pp. 978-989.

* cited by examiner

| current state | next state for ... | |
| --- | --- | --- |
| | (k & 1) == 0 | (k & 1) == 1 |
| 0 | 0 | 2 |
| 1 | 2 | 0 |
| 2 | 1 | 3 |
| 3 | 3 | 1 |

```
residual_tb( ... )
{
    last_significant_coefficient_pos_x_prefix
    last_significant_coefficient_pos_y_prefix
    last_significant_coefficient_pos_x_suffix
    last_significant_coefficient_pos_y_prefix for( i=lasrSubBlock ; i>=0; i-- ) {
     if( i < lastSubBlock ) {
        coded_sub_block_flag [ i ]
        if(codedSubBlockFlag [ i ] ) {
          residual_subblock ( ... )
        }
      }
    }
}
```

```
residual_subblock ( ... )
{
    numRegBins = is2x2CG ? 8 : 32 for( k = firstPos ... ; remRegBins >= 4 ... ; k--)  {  // first pass
     sig_flag[ k ]        // ctx depends on prev. par_flag's
     remRegBins -- // decrement remRegBins
      if( sig_flag[ k ] ) {
        gt1_flag[ k ]
         if ( gt1_flag[k] ) {
            par_flag[ k ]     // context-based coding (regular)
            remRegBins -- // decrement remRegBins
            gt3_flag[ k ]    // context-based coding (regular)
            remRegBins -- // decrement remRegBins
         }
        coeff[k] = 1 + parFlag + gt1Flag + (gt3Flag << 1)
      }
    firstPosMode2 = k
    for( k=firstPos; k >firstPosMode2; k-- )  {  // second pass (EP bins)
      if( coeff[k] >= 4 )
        remainder[ k ]
    } for ( k = firstPosMode2 ; k > lastPos ; k-- ) {// coeff bypass (EP bins)
      abs_level[ k ]
    }
    sign_data
}
```

FIG. 7B

```
coding_unit( ... )
{
    cu_ckip_flag
    If ( cu_skip_flag == 0 )
      cu_pred_mode_flag if( cu_skip_flag ==0 && cuPredMode != MODE_INTRA ){
      pred_mode_ibc_flag
    }

If( cuPredMode == IMODE_NTRA ){
      intra_prediction_data
    }
    else { // MODE_INTER or MODE_IBC
      inter_prediction_data
    }

If (!pcm_flag){
      if( cuPredMode != MODE_INTRA && merge_flag==0 )
        cu_cbf
        if ( cu_cbf ) {
          // SBT mode related signaling transform_tree( ... )
      }
}
```

FIG. 8A

```
Transform_tree( ... )
{
    If ( IntraSubPartSize == NO_ISP_FLAG ){
      If ( IntraSubPartSize == NO_ISP_FLAG )
        if (width > MaxTbSizeX || height > MaxTbSizeY )
          quad-tree split into 4 sub-transform-trees
      }
      else {
        transform_unit( ... )
      }
    }
    Else if ( cu_sbt_fag ) {
      split into 2 transform-unit according to SBT syntax
      transform_unit( ... )
      transform_unit( ... )
    }
    else {
      split into 2 transform-unit according to ISP syntax
      transform_unit( ... )
      transform_unit( ... )
    }
}
```

FIG. 8B

```
transform_unit( ... )
{
    tu_cbf_luma
    tu_cbf_cb
    tu_cbf_cr

If(tu_cbf_luma ||tu_cbf_cb || tu_cbf_cr){
      cu_qp_delta_abs
      cu_qp_delta_sign_flag
    }

If( widt <= 32 && height <=32 ... ){
      transform_skip_flag
    }

If( width <= 32 && height <= 32 && !transform_skip_flag){
      tu_mts_idx
    } if( tu_cbf_luma ){
      Residual_tb ( ... , compId=Y,..)
    }
    if( tu_cbf_cb ){
      Residual_tb ( ... , compId=Cb,..)
    }
    if( tu_cbf_cr ){
      Residual_tb ( ... , compId=Cr,..)
    }
}
```

FIG. 8C

```
residual_subblock ( numRegBins_in_out )
{
   remRegBins = numRegBins_in_out for( k = firstPos ... ; remRegBins >= 4 ... ; k--) { // first pass
    sig_flag[ k ]        // ctx depends on prev. par_flag's
    remRegBins -- // decrement remRegBins
    if( sig_flag[ k ] ) {
      gt1_flag[ k ]
       if ( gt1_flag[k] ) {
          par_flag[ k ]     // context-based coding (regular)
          remRegBins -- // decrement remRegBins
          gt3_flag[ k ]    // context-based coding (regular)
          remRegBins -- // decrement remRegBins
       }
      coeff[k] = 1 + parFlag + gt1Flag + (gt3Flag << 1)
   }
   firstPosMode2 = k
   for( k=firstPos; k >firstPosMode2; k-- ) { // second pass (EP bins)
    if( coeff[k] >= 4 )
      remainder[ k ]
   } for ( k = firstPosMode2 ; k > lastPos ; k-- ) { // coeff bypass (EP bins)
    abs_level[ k ]
   }
   sign_data
   numRegBins_in_out  = remRegBins
}
```

```
residual_tb( ... )
{
    unitary_budget = 2;
    TB_level_remRegBins = unitary_budget * width*height last_significant_coefficient_pos_x_prefix
    last_significant_coefficient_pos_y_prefix
    last_significant_coefficient_pos_x_suffix
    last_significant_coefficient_pos_y_prefix for( i=lasrSubBlock ; i>=0; i-- ) {
     if( i < lastSubBlock ) {
        coded_sub_block_flag [ i ]
        if(codedSubBlockFlag [ i ] ) {
         residual_subblock (TB_level_remRegBins )
        }
      }
    }
}
```

FIG. 13B

```
residual_tb( ... )
{
    last_significant_coefficient_pos_x_prefix
    last_significant_coefficient_pos_y_prefix
    last_significant_coefficient_pos_x_suffix
    last_significant_coefficient_pos_y_prefix unitary_budget = 2;
    TB_level_remRegBins = unitary_budget * last_pos_x * last_pos_y for( i=lasrSubBlock ; i>=0; i-- ) {
     if( i < lastSubBlock ) {
        coded_sub_block_flag [ i ]
        if(codedSubBlockFlag [ i ] ) {
         residual_subblock (TB_level_remRegBins )
        }
      }
    }
}
```

```
transform_unit( ... )
{
    unitary_budget = 2; // average regular bins rate is 2 bins / sample
    TU_level_remRegBins = unitary_budget * width*height *3 / 2 tu_cbf_luma
    tu_cbf_cb
    tu_cbf_cr

If(tu_cbf_luma || tu_cbf_cb || tu_cbf_cr){
     cu_qp_delta_abs
     cu_qp_delta_sign_flag
    }

If( widt <= 32 && height <=32 ... ){
     transform_skip_flag
    }

If( width <= 32 && height <= 32 && !transform_skip_flag){
     tu_mts_idx
    } if( tu_cbf_luma ){
     Residual_tb (TU_level_remRegBins, ... , compId=Y,..)
    }
    if( tu_cbf_cb ){
     Residual_tb ( TU_level_remRegBins, ... , compId=Cb,..)
    }
    if( tu_cbf_cr ){
     Residual_tb ( TU_level_remRegBins, ... , compId=Cr,..)
    }
}
```

FIG. 14A

```
transform_unit( ... )
{
   unitary_budget = 2; // average regular bins rate is 2 bins / sample
   TU_level_RegBins = unitary_budget * width*height *3 / 2 tu_cbf_luma
    tu_cbf_cb
    tu_cbf_cr

If(tu_cbf_luma ||tu_cbf_cb || tu_cbf_cr){
    cu_qp_delta_abs
    cu_qp_delta_sign_flag
   }

If( widt <= 32 && height <=32 ... ){
    transform_skip_flag
   }

If( width <= 32 && height <= 32 && !transform_skip_flag){
    tu_mts_idx
   } if( tu_cbf_luma ){
    bins_Y = TU_level_RegBins * 2 /3
    Residual_tb (bins_Y, ... , compId=Y,..)
   }
   if( tu_cbf_cb ){
    bins_Cb = (TU_level_RegBins - binsY ) /2
    Residual_tb ( bins_Cb, ... , compId=Cb,..)
   }
   if( tu_cbf_cr ){
    bins_Cr = TU_level_RegBins - binsY - binCb)
    Residual_tb ( bins_Cr, ... , compId=Cr,..)
   }
}
```

FIG. 14B

```
residual_tb ( numRegBins_in_out )
{
    last_significant_coefficient_pos_x_prefix
    last_significant_coefficient_pos_y_prefix
    last_significant_coefficient_pos_x_suffix
    last_significant_coefficient_pos_y_prefix for( i= lastSubBlock  i>=0; i-- ) {
     if( i < lastSubBlock ) {
        coded_sub_block_flag [ i ]
        if(codedSubBlockFlag [ i ] ) {
          residual_subblock (numRegBins_in_out )
        }
      }
    }
}
```

FIG. 14C

```
coding_unit( ... )
{
  unitary_budget = 2; // average regular bins rate is 2 bins / sample
  CU_level_remRegBins = unitary_budget *width*height *3 / 2 cu_ckip_flag
   If ( cu_skip_flag == 0 )
    cu_pred_mode_flag if( cu_skip_flag ==0 && cuPredMode != MODE_INTRA ){
    pred_mode_ibc_flag
   }

If( cuPredMode == IMODE_NTRA ){
    intra_prediction_data
   }
   else { // MODE_INTER or MODE_IBC
    inter_prediction_data
   }

If (!pcm_flag){
    if( cuPredMode != MODE_INTRA && merge_flag==0 )
     cu_cbf
     if ( cu_cbf ) {
       // SBT mode related signaling transform_tree(CU_level_remRegBins , ... )
   }
}
```

FIG. 15A

```
Transform_tree(CU_level_remRegBins , ... )
{
    If ( IntraSubPartSize == NO_ISP_FLAG ){
     If ( IntraSubPartSize == NO_ISP_FLAG )
       if (width > MaxTbSizeX || height > MaxTbSizeY )
         quad-tree split into 4 sub-transform-trees
     }
     else {
        transform_unit(CU_level_remRegBins , ... )
     }
    }
    Else if ( cu_sbt_fag ) {
       split into 2 transform-unit according to SBT syntax
       transform_unit(CU_level_remRegBins , ... )
       transform_unit(CU_level_remRegBins , ... )
    }
    else {
       split into 2 transform-unit according to ISP syntax
       transform_unit(CU_level_remRegBins , ... )
       transform_unit(CU_level_remRegBins , ... )
    }
}
```

FIG. 15B

```
Transform_tree(CU_level_remRegBins , ... )
{
    If ( IntraSubPartSize == NO_ISP_FLAG ){
      If ( IntraSubPartSize == NO_ISP_FLAG )
        if (width > MaxTbSizeX || height > MaxTbSizeY )
          quad-tree split into 4 sub-transform-trees
      }
      else {
        transform_unit(CU_level_remRegBins , ... )
      }
    }
    Else if ( cu_sbt_fag ) {
      split into 2 transform-unit according to SBT syntax
      transform_unit(sbt_coded ? CU_level_remRegBins : 0, ... )
      transform_unit(sbt_coded ? CU_level_remRegBins : 0, ... )
    }
    else {
      split into 2 transform-unit according to ISP syntax
      regBins = CU_level_remRegBins/2
      transform_unit(regBins, ... )
      transform_unit( (CU_level_remRegBins – regBins) , ... )
    }
}
```

FIG. 15C

```
transform_unit(TU_regBins , ... )
{
   tu_cbf_luma
   tu_cbf_cb
   tu_cbf_cr If(tu_cbf_luma ||tu_cbf_cb || tu_cbf_cr){
    cu_qp_delta_abs
    cu_qp_delta_sign_flag
   }

If( widt <= 32 && height <=32 ... ){
    transform_skip_flag
   }

If( width <= 32 && height <= 32 && !transform_skip_flag){
    tu_mts_idx
   } if( tu_cbf_luma ){
    Residual_tb (TU_regBins , ... , compId=Y,..)
   }
   if( tu_cbf_cb ){
    Residual_tb (TU_regBins , ... , compId=Cb,..)
   }
   if( tu_cbf_cr ){
    Residual_tb (TU_regBins , ... , compId=Cr,..)
   }
}
```

FIG. 15D

```
transform_unit(TU_RegBins , ... )
{
    tu_cbf_luma
    tu_cbf_cb
    tu_cbf_cr If(tu_cbf_luma || tu_cbf_cb || tu_cbf_cr){
      cu_qp_delta_abs
      cu_qp_delta_sign_flag
    }

If( widt <= 32 && height <=32 ... ){
      transform_skip_flag
    }

If( width <= 32 && height <= 32 && !transform_skip_flag){
      tu_mts_idx
    } if( tu_cbf_luma ){
      bins_Y = TU_RegBins * 2 /3
      Residual_tb (bins_Y, ... , compId=Y,..)
    }
    if( tu_cbf_cb ){
      bins_Cb = (TU_RegBins  - binsY ) /2
      Residual_tb ( bins_Cb, ... , compId=Cb,..)
    }
    if( tu_cbf_cr ){
      bins_Cr = TU_RegBins  - binsY - binCb)
      Residual_tb ( bins_Cr, ... , compId=Cr,..)
    }
}
```

```
residual_subblock_all_bypass ()
{
    remRegBins = numRegBins_in_out

K=firstPos
    firstPosMode2 = k for ( k = firstPosMode2 ; k > lastPos ; k-- ) {
     abs_level[ k ]
    }
    sign_data
    numRegBins_in_out  = remRegBins
}
```

FIG. 16B

```
residual_subblock_all_regular ()
{
    for( k = firstPos ... ; remRegBins >= 4 ... ; k--)  { // first pass
     sig_flag[ k ]       // ctx depends on prev. par_flag's
    if( sig_flag[ k ]) {
       gt1_flag[ k ]
        if ( gt1_flag[k] ) {
           par_flag[ k ]     // context-based coding (regular)
           gt3_flag[ k ]     // context-based coding (regular)
        }
        coeff[k] = 1 + parFlag + gt1Flag + (gt3Flag << 1)
    }
    firstPosMode2 = k
    for( k=firstPos; k >lastPos; k--)  { // second pass (EP bins)
     if( coeff[k] >= 4 )
        remainder[ k ]
    } sign_data
    numRegBins_in_out  = remRegBins
}
```

FLEXIBLE ALLOCATION OF REGULAR BINS IN RESIDUAL CODING FOR VIDEO CODING

CROSS REFERENCE TO RELATED APPLICATIONS

This application is the national stage entry under 35 U.S.C. § 371 of International Application PCT/US2020/021281, filed Mar. 6, 2020 which was published in accordance with PCT Article 21(2) on Sep. 17, 2020, in English, and which claims the benefit of European Patent Application No. 19305292.5, filed Mar. 12, 2019, European Patent Application No. 19305645.4, filed May 21, 2019 and European Patent Application No. 19305649.6, May 23, 2019.

TECHNICAL FIELD

At least one of the present embodiments generally relates to the allocation of regular bins in residual coding for video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments handles a high-level constraint on the maximum usage of regular CABAC coding of bins, in the residual coding process of blocks and their coefficient groups, so that the high-level constraint is respected and the compression efficiency is improved compared to current approaches.

According to a first aspect of at least one embodiment, a video encoding method comprises a residual encoding process using a limited number of regular bins to code syntax elements representative of a picture area comprising coding groups, wherein the coding is a CABAC encoding and wherein the number of regular bins is determined based on a budget allocated amongst a plurality of coding groups.

According to a second aspect of at least one embodiment, a video decoding method comprises a residual decoding process using regular bins to parse a bitstream representative of a picture area comprising coding groups, wherein the decoding is done using CABAC decoding and wherein the number of regular bins is determined based on a budget allocated amongst a plurality of coding groups.

According to a third aspect of at least one embodiment, an apparatus, comprises an encoder for encoding picture data for at least one block in a picture or video wherein the encoder is configured to perform a residual encoding process using a limited number of regular bins to code syntax elements representative of a picture area comprising coding groups, wherein the coding is a CABAC encoding and wherein the number of regular bins is determined based on a budget allocated amongst a plurality of coding groups.

According to a fourth aspect of at least one embodiment, an apparatus, comprises a decoder for decoding picture data for at least one block in a picture or video wherein the decoder is configured to perform a residual decoding process using regular bins to parse a bitstream representative of a picture area comprising coding groups, wherein the decoding is done using CABAC decoding and wherein the number of regular bins is determined based on a budget allocated amongst a plurality of coding groups.

According to a fifth aspect of at least one embodiment, a computer program comprising program code instructions executable by a processor is presented, the computer program implementing the steps of a method according to at least the first or second aspect.

According to an sixth aspect of at least one embodiment, a computer program product which is stored on a non-transitory computer readable medium and comprises program code instructions executable by a processor is presented, the computer program product implementing the steps of a method according to at least the first or second aspect.

BRIEF DESCRIPTION OF THE DRAWINGS

FIG. 7B illustrates an example of the CG-level residual coding syntax.

FIG. 8A illustrates an example of the CU-level syntax.

FIG. 8B illustrates the an example of transform_tree syntax structure.

FIG. 8C shows the transform unit level syntax arrangement.

FIG. 12 illustrates an example of modified process for encode/decode a coding group using the CABAC optimizer.

FIG. 13A illustrates an example embodiment where the budget of regular bins is determined at the transform block level.

FIG. 13B illustrates an example embodiment where the budget of regular bins is determined at the transform block level according to the position of the last significant coefficient.

FIG. 14A illustrates an example embodiment where the budget of regular bins is determined at the transform unit level.

FIG. 14B illustrates an example embodiment where the budget of regular bins is determined at the transform unit level and allocated between transform blocks as a function of the relative surface between different transform blocks, and as a function of regular bins used in already coded/parsed transform blocks in the considered transform unit.

FIG. 14C illustrates an example embodiment of process for TB-level residual coding/parsing.

FIG. 15A illustrates an example embodiment where the budget of regular bins is allocated at the coding unit level.

FIG. 15B illustrates an example embodiment of coding/parsing of the transform tree associated to the current CU based on the CU-level assigned regular bins budget.

FIG. 15C illustrates a variant embodiment of the coding tree coding/parsing process when the budget is fixed at the CU level.

FIG. 15D and FIG. 15E show the transform unit coding/parsing process, adapted for the present embodiment when the regular bins budget is fixed on the CU level.

FIG. 16A and FIG. 16B illustrate an example embodiment where the budget of regular bins is allocated at a higher level than the CG-level and to use two types of CG coding/parsing processes.

DETAILED DESCRIPTION

Various embodiments relate to the entropy coding of quantized transform coefficients. This stage of the video codec is also called the residual coding step. At least one embodiment aims at optimizing the coding efficiency of the video codec, under the constraint of a maximum number of regular-coded bins per unity of area.

Figure 1:
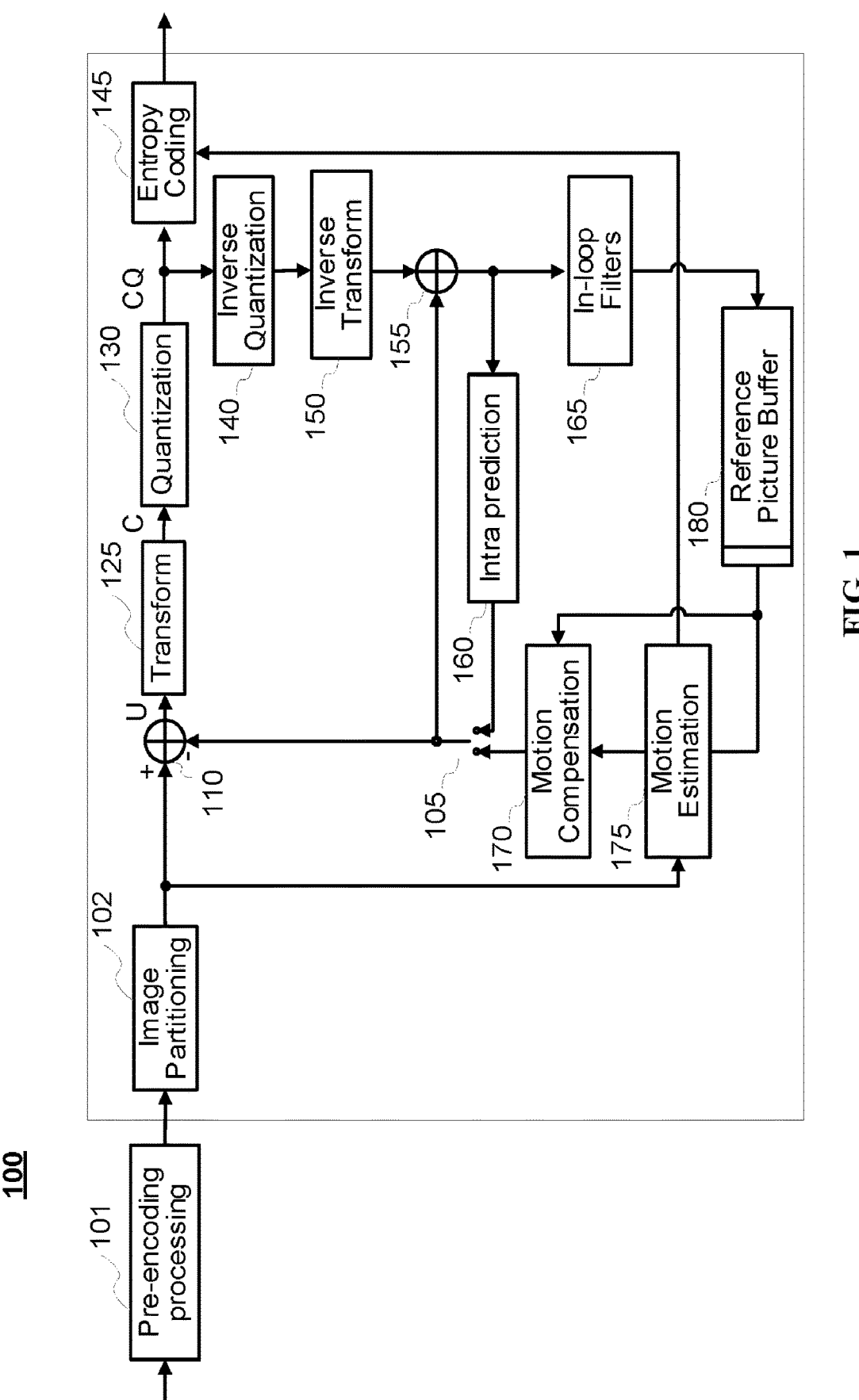
FIG. 1 illustrates a block diagram of an example of video encoder 100, such as a High Efficiency Video Coding (HEVC) encoder.
Figure 2:
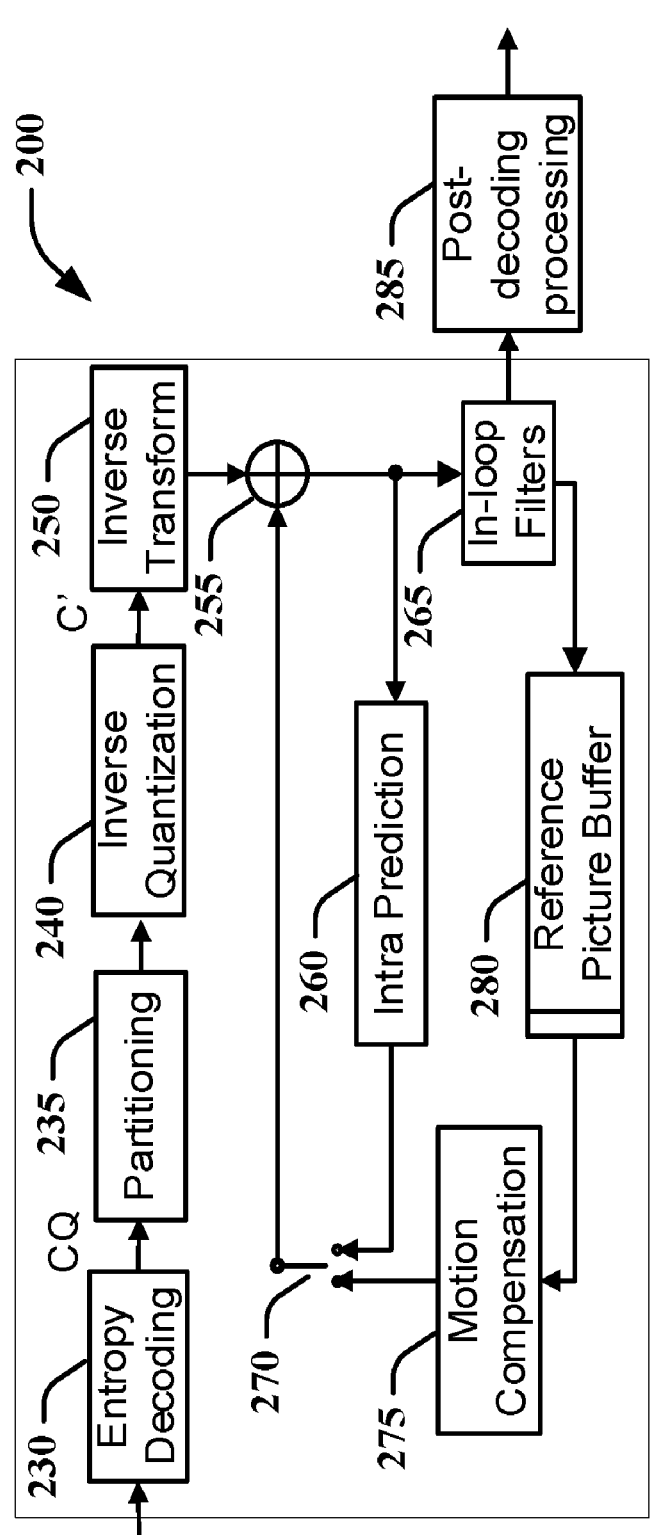
FIG. 2 illustrates a block diagram of an example of video decoder 200, such as an HEVC decoder.

Various methods and other aspects described in this application can be used to modify at least the entropy coding and/or decoding modules (145, 230) of a video encoder 100 and decoder 200 as shown in FIGS. 1 and 2. Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates block diagram of an example of video encoder 100, such as a HEVC encoder. FIG. 1 may also illustrate an encoder in which improvements are made to the HEVC standard or an encoder employing technologies similar to HEVC, such as a JEM (Joint Exploration Model) or VTM (VVC Test Model) encoder under development by JVET (Joint Video Exploration Team) for VVC.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM or VVC decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
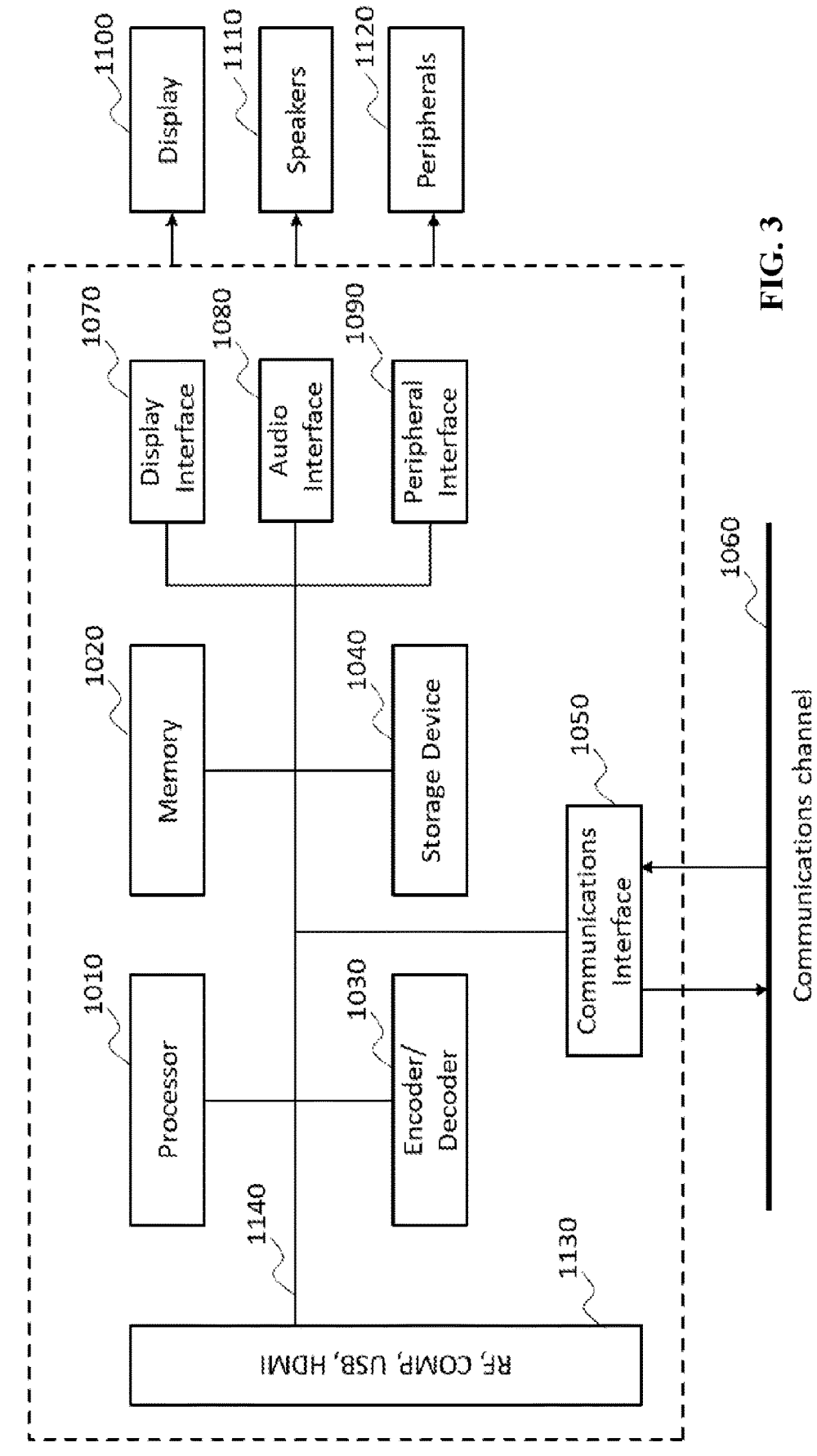
FIG. 3 illustrates a block diagram of an example of a system in which various aspects and embodiments are implemented.

FIG. 3 illustrates a block diagram of an example of a system in which various aspects and embodiments are implemented. System 300 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 300, singly or in combination, can be embodied in a single integrated circuit, multiple ICs, and/or discrete components. For example, in at least one embodiment, the processing and encoder/decoder elements of system 300 are distributed across multiple ICs and/or discrete components. In various embodiments, the elements of system 300 are communicatively coupled through an internal bus 310. In various embodiments, the system 300 is communicatively coupled to other similar systems, or to other electronic devices, via, for example, a communications bus or through dedicated input and/or output ports. In various embodiments, the system 300 is configured to implement one or more of the aspects described in this document, such as the video encoder 100 and video decoder 200 described above and modified as described below.

The system 300 includes at least one processor 301 configured to execute instructions loaded therein for implementing, for example, the various aspects described in this document. Processor 301 can include embedded memory, input output interface, and various other circuitries as known in the art. The system 300 includes at least one memory 302 (e.g., a volatile memory device, and/or a non-volatile memory device). System 300 includes a storage device 304, which can include non-volatile memory and/or volatile memory, including, but not limited to, EEPROM, ROM, PROM, RAM, DRAM, SRAM, flash, magnetic disk drive, and/or optical disk drive. The storage device 304 can include an internal storage device, an attached storage device, and/or a network accessible storage device, as non-limiting examples.

System 300 includes an encoder/decoder module 303 configured, for example, to process data to provide an encoded video or decoded video, and the encoder/decoder module 303 can include its own processor and memory. The encoder/decoder module 303 represents module(s) that can be included in a device to perform the encoding and/or decoding functions. As is known, a device can include one or both of the encoding and decoding modules. Additionally, encoder/decoder module 303 can be implemented as a separate element of system 300 or can be incorporated within processor 301 as a combination of hardware and software as known to those skilled in the art.

Program code to be loaded onto processor 301 or encoder/decoder 303 to perform the various aspects described in this document can be stored in storage device 304 and subsequently loaded onto memory 302 for execution by processor 301. In accordance with various embodiments, one or more of processor 301, memory 302, storage device 304, and encoder/decoder module 303 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 301 and/or the encoder/decoder module 303 is used to store instructions and to provide working memory for processing that is needed during encoding or decoding. In other embodiments, however, a memory external to the processing device (for example, the processing device can be either the processor 301 or the encoder/decoder module 303) is used for one or more of these functions. The external memory can be the memory 302 and/or the storage device 304, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 300 can be provided through various input devices as indicated in block 309. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 309 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing IC or within processor 301 as necessary. Similarly, aspects of USB or HDMI interface processing can be implemented within separate interface ICs or within processor 301 as necessary. The demodulated, error corrected, and demultiplexed stream is provided to various processing elements, including, for example, processor 301, and encoder/decoder 303 operating in combination with the memory and storage elements to process the datastream as necessary for presentation on an output device.

Various elements of system 300 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 300 includes communication interface 305 that enables communication with other devices via communication channel 320. The communication interface 305 can include, but is not limited to, a transceiver configured to transmit and to receive data over communication channel 320. The communication interface 305 can include, but is not limited to, a modem or network card and the communication channel 320 can be implemented, for example, within a wired and/or a wireless medium.

Data is streamed to the system 300, in various embodiments, using a Wi-Fi network such as IEEE 802.11. The Wi-Fi signal of these embodiments is received over the communications channel 320 and the communications interface 305 which are adapted for Wi-Fi communications. The communications channel 320 of these embodiments is typically connected to an access point or router that provides access to outside networks including the Internet for allowing streaming applications and other over-the-top communications. Other embodiments provide streamed data to the system 300 using a set-top box that delivers the data over the HDMI connection of the input block 309. Still other embodiments provide streamed data to the system 300 using the RF connection of the input block 309.

The system 300 can provide an output signal to various output devices, including a display 330, speakers 340, and other peripheral devices 350. The other peripheral devices 350 include, in various examples of embodiments, one or more of a stand-alone DVR, a disk player, a stereo system, a lighting system, and other devices that provide a function based on the output of the system 300. In various embodiments, control signals are communicated between the system 300 and the display 330, speakers 340, or other peripheral devices 350 using signaling such as AV.Link, CEC, or other communications protocols that enable device-to-device control with or without user intervention. The output devices can be communicatively coupled to system 300 via dedicated connections through respective interfaces 306, 307, and 308. Alternatively, the output devices can be connected to system 300 using the communications channel 320 via the communications interface 305. The display 330 and speakers 340 can be integrated in a single unit with the other components of system 300 in an electronic device such as, for example, a television. In various embodiments, the display interface 306 includes a display driver, such as, for example, a timing controller (T Con) chip.

The display 330 and speaker 340 can alternatively be separate from one or more of the other components, for example, if the RF portion of input 309 is part of a separate set-top box. In various embodiments in which the display 330 and speakers 340 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Figure 4A:
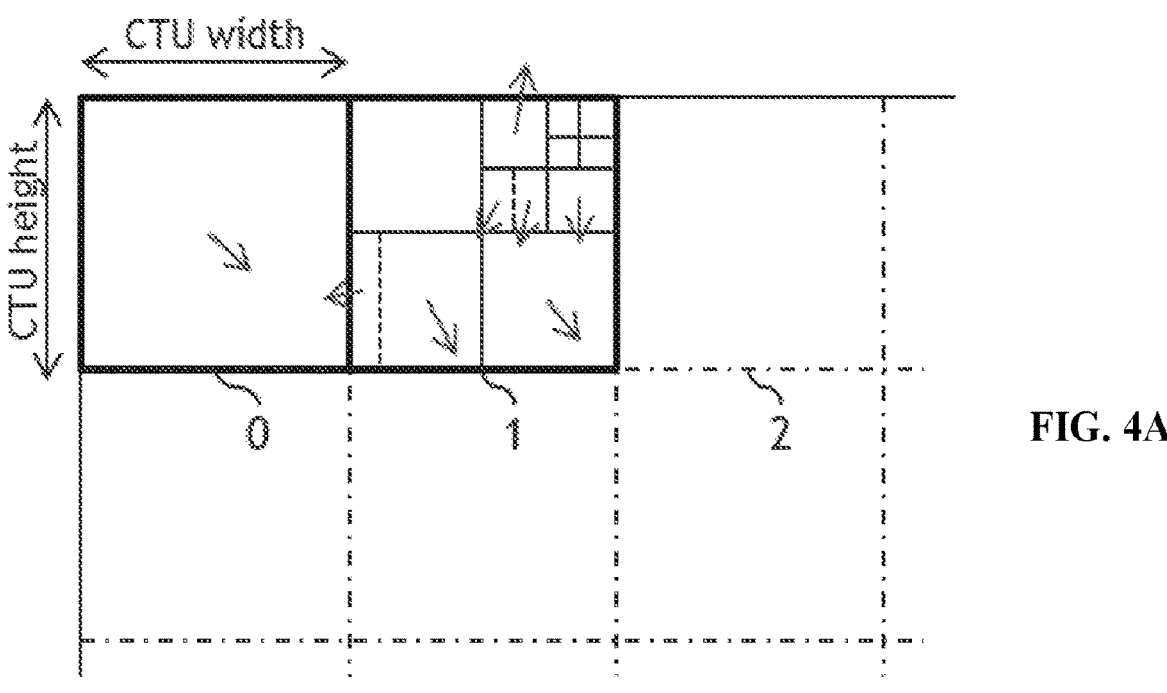
FIG. 4A illustrates an example of coding tree unit and coding tree in the compressed domain.

FIG. 4A illustrates an example of coding tree unit and coding tree in the compressed domain. In the HEVC video compression standard, motion compensated temporal prediction is employed to exploit the redundancy that exists between successive pictures of a video. To do so, a picture is partitioned into so-called Coding Tree Units (CTU), which size is typically 64×64, 128×128, or 256×256 pixels. Each CTU is represented by a Coding Tree in the compressed domain, for example in a quad-tree division of the CTU. Each leaf is called a Coding Unit (CU).

Figure 4B:
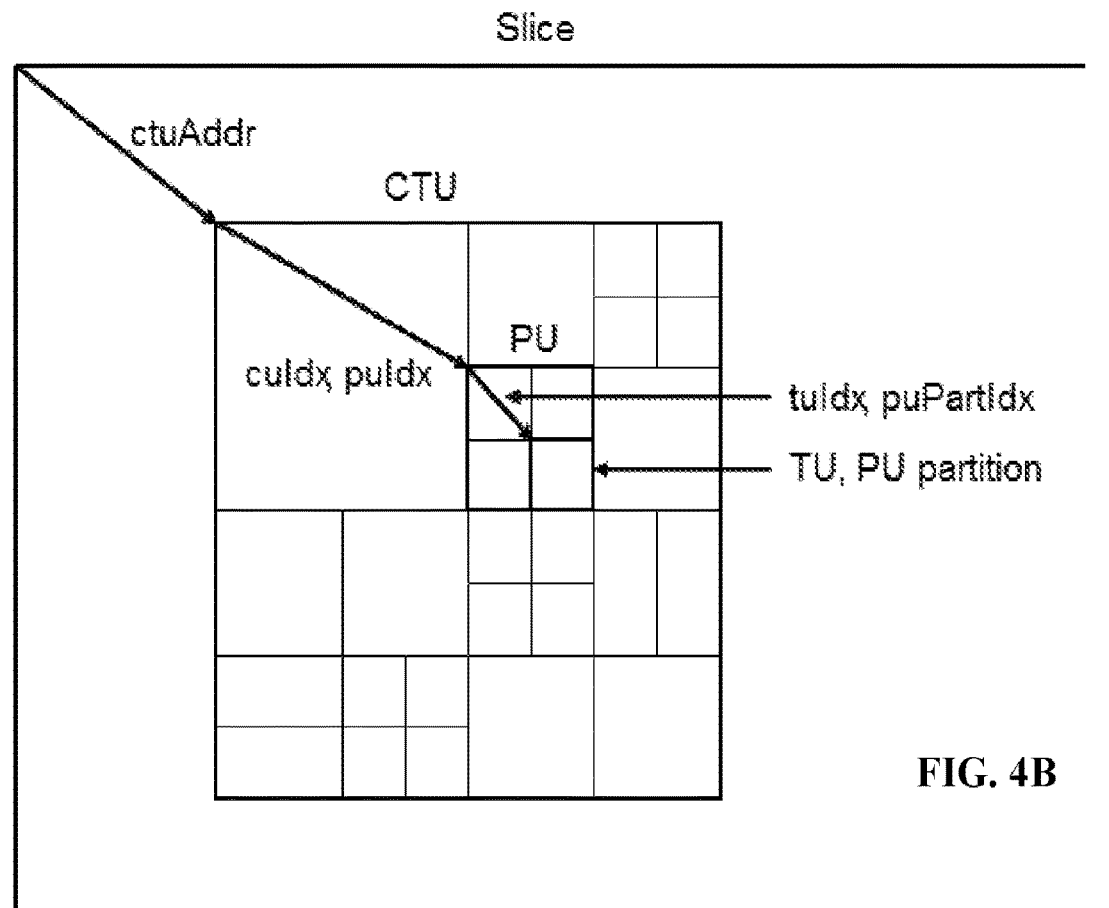
FIG. 4B illustrates an example of division of a CTU into coding units, prediction units and transform units.

FIG. 4B illustrates an example of division of a CTU into coding units, prediction units and transform units. Each CU is then given some Intra or Inter prediction parameters Prediction Info). To do so, it is spatially partitioned into one or more Prediction Units (PUs), each PU being assigned some prediction information such as a motion vector. The Intra or Inter coding mode is assigned on the CU level.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side. The term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Figure 5:
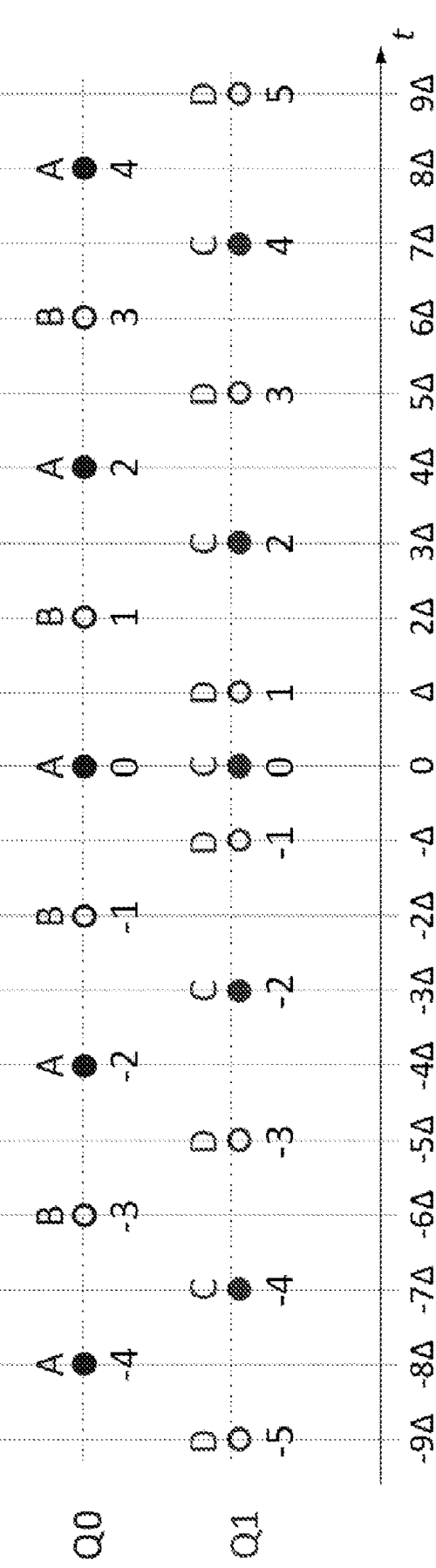
FIG. 5 illustrates the use of two scalar quantizers in dependent scalar quantization.

FIG. 5 illustrates the use of two scalar quantizers in dependent scalar quantization. Dependent scalar quantization, as proposed in JVET (contribution JVET-J0014), uses two scalar quantizers with different reconstruction levels for quantization. In comparison to conventional scalar quantization (as used for example in HEVC and VTM-1), the main effect of this approach is that the set of admissible reconstruction values for a transform coefficient depends on the values of the transform coefficient level that precedes the current transform coefficient level in reconstruction order. The approach of dependent scalar quantization is realized by: (a) defining two scalar quantizers with different reconstruction levels and (b) defining a process for switching between the two scalar quantizers. The two scalar quantizers used, denoted by Q0 and Q1, are illustrated in FIG. 5. The location of the available reconstruction levels is uniquely specified by a quantization step size 4. When neglecting the fact that the actual reconstruction of transform coefficients uses integer arithmetic, the two scalar quantizers Q0 and Q1 are characterized as follows:

Q0: The reconstruction levels of the first quantizer Q0 are given by the even integer multiples of the quantization step size $\Delta$. When this quantizer is used, a dequantized transform coefficient t' is calculated according to $$t'=2 \cdot k \cdot \Delta,$$

where k denotes the associated quantized coefficient (transmitted quantization index).

Q1: The reconstruction levels of the second quantizer Q1 are given by the odd integer multiples of the quantization step size $\Delta$, plus the reconstruction level equal to zero. A dequantized transform coefficient t' is computed as a function of the quantized coefficient k as follows:

$$t'=(2 \cdot k - \operatorname{sgn}(k)) \cdot \Delta,$$

where sgn($\cdot$) is the sign function defined as:

$$\operatorname{sgn}(x)=(k==0?0:(k<0?-1:1)).$$

The scalar quantizer used (Q0 or Q1) is not explicitly signaled in the bitstream. Instead, the quantizer used for a current transform coefficient is determined by the parity of the quantized coefficient that precedes the current transform coefficient in coding/reconstruction order, and the state of a finite state machine that it introduced in the following.

Figures 6A, 6B:
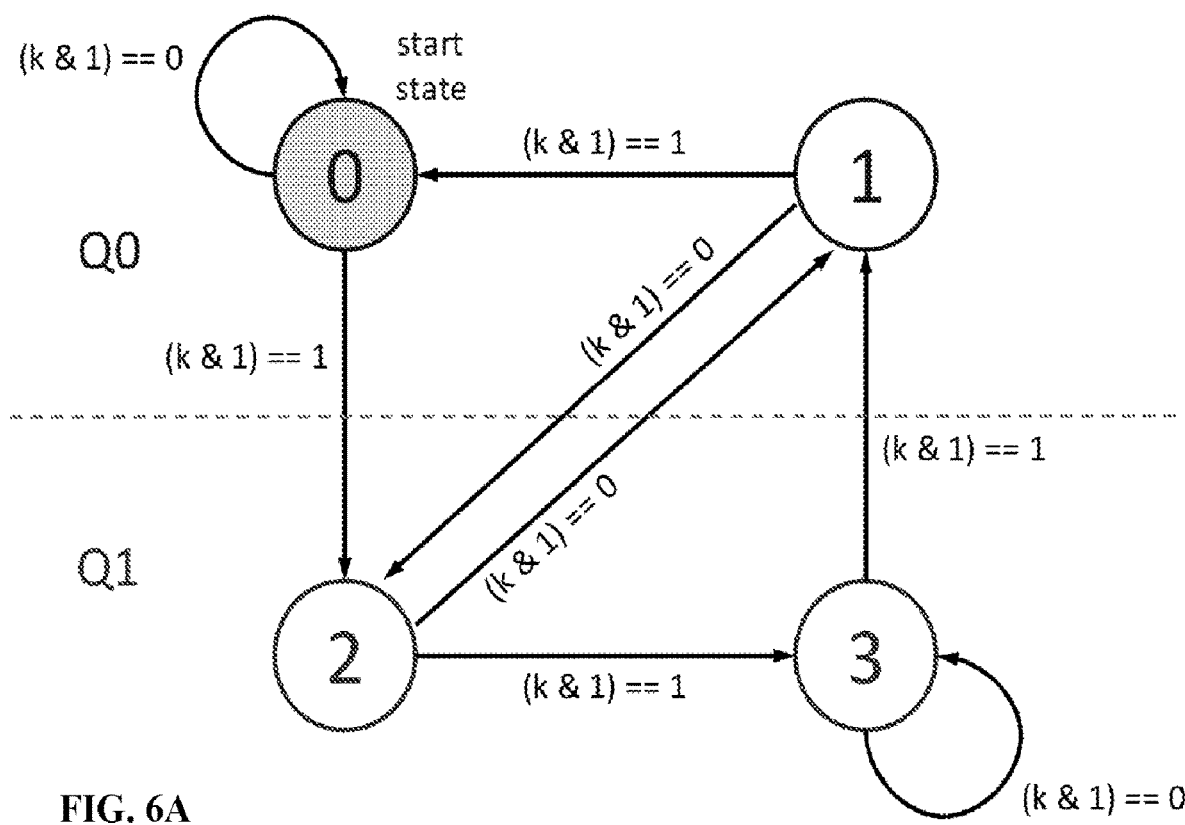
FIGS. 6A and 6B illustrates the an example mechanisms to switch between scalar quantizers.

FIGS. 6A and 6B illustrates the mechanisms to switch between scalar quantizers in VVC. The switching between the two scalar quantizers (Q0 and Q1) is realized via a finite state machine with four states, respectively labeled as 0, 1, 2 or 3, as shown in FIG. 6A. The state of the finite state machine considered for a given quantized coefficient is uniquely determined by the parity of the quantized coefficient k that precedes current quantized coefficient in coding/reconstruction order, and the state of the finite state machine considered when processing this preceding coefficient. At the start of the inverse quantization for a transform block, the state is set equal to 0. The transform coefficients are reconstructed in scanning order (i.e., in the same order they are entropy decoded). After a current transform coefficient is reconstructed, the state is updated. k is the quantized coefficient. Next state depends on the current state and the parity (k & 1) of current quantized coefficient k:

$$\text{state}=\text{stateTransTable}[\text{current\_state}][k\&1],$$

where stateTransTable represents the state transition table shown in FIG. 6B and the operator & specifies the bit-wise "and" operation in two's-complement arithmetic.

Moreover, the quantized coefficients contained in a so-called transform-block (TB) can be entropy coded and decoded as described below.

First, a transform block is divided into 4×4 sub-blocks of quantized coefficients called Coding Groups, sometimes also named Coefficient Groups and abbreviated CG. The entropy coding/decoding is made of several scanning passes, which scan the TB according to the diagonal scanning order shown by FIG. 6C.

Transform coefficient coding in VVC involves five main steps: scanning, last significant coefficient coding, significance map coding, coefficient level remainder coding, absolute level and sign data coding.

Figures 6C, 7A:
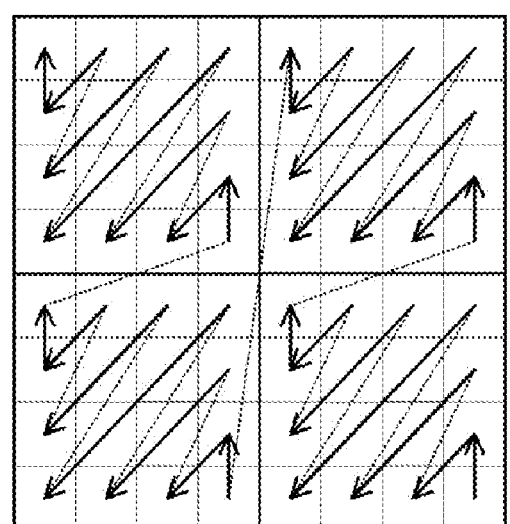
FIG. 6C illustrates the an example of scanning order between CGs and coefficients, as used in VVC in an 8×8 transform block.
FIG. 7A illustrates an example of syntax element for the coding/parsing for a transform block.

FIG. 6C illustrates the scanning order between CGs and coefficients used in VVC in an 8×8 transform block. A scan pass over a TB then comprises processing each CG sequentially according the diagonal scanning order, and the 16 coefficients inside each CG are scanned according to the considered scanning order as well. A scanning pass starts at the last significant coefficient in the TB and processes all coefficients until the DC coefficient.

The entropy coding of transform coefficients comprises up to 7 syntax elements in the following list:

coded_sub_block_flag: significance of a coefficient group (CG)

sig_flag: significance of a coefficient (zero/nonzero).

gt1_flag: indicates if the absolute value of a coefficient level is greater than 1 par_flag: indicates the parity of the coefficient which is greater than 1 gt3_flag: indicates if the absolute value of a coefficient level is greater than 3 remainder: remaining value for absolute value of a coefficient level (if value is larger than that coded in previous passes)

abs_level: value of the absolute value of a coefficient level (if no CABAC bin has been signaled for current coefficient for max number of bin budget matters)

sign_data: sign of all significant coefficients contained in the considered CG. It comprises a series of bins, each signaling the sign of each non-zero transform coefficient (0: positive, 1: negative).

Once a quantized coefficient's absolute value is known by decoding a subset of the above elements (apart from the sign), then no further syntax element is coded for that coefficient, with regards to its absolute value. In the same way, the sign-flag is signaled only for non-zero coefficients.

All necessary scanning passes for a given CG are coded until all the quantized coefficients in that CG can be reconstructed, before going to next CG.

The overall decoding TB parsing process is made of the following mains steps:

1. Decode the Last Significant coefficient Coordinate. This includes the following syntax elements: last_sig_coeff_x_prefix, last_sig_coeff_y_prefix, last_sig_coeff_x_suffix, and last_sig_coeff_y_suffix. This provides the decoder with the spatial position (x- and y-coordinates) of the last non-zero coefficient in the whole TB.

Then for each successive CG from the CG containing the last significant coefficient in the TB to the top-left CG in the TB, the following steps apply:

2. Decode the CG significance flag (which is called coded_sub_block_flag in the VVC specification).

3. Decode the significant coefficient flag for each coefficient in the considered CG. This corresponds to the syntax element sig_flag. This indicates which coefficients are non-zero in the CG.

Next parsing stage is related to the coefficient level, for coefficients known as non-zero, in the considered CG. This involves the following syntax elements:

4. gt1_flag: this flag indicates if current coefficient's absolute value is higher than 1 or not. If not, the absolute value is equal to 1.

5. par_flag: this flag indicates if current quantized coefficient is even or not. It is coded if the gt1_flag of current quantized coefficient is true. If the par_flag is zero then the quantized coefficient is even, otherwise it is odd. After the par_flag is parsed on the decoder side, the partially decoded quantized coefficient is set equal to (1+gt1_flag+par_flag)

6. gt3_flag: this flag indicates if current coefficient's absolute value is higher than 3 or not. If not, the absolute value if equal to 1+gt1 flag+par_flag. The gt3_flag is coded if 1+gt1_flag+par_flag is greater or equal to 2. Once the gt3_flag is parsed, then the quantized coefficient value becomes 1+gt1_flag+par_flag+(2*gt3_flag) on the decoder side.

7. remainder: this encodes the absolute value of the coefficient. This applies if the partially decoded absolute value is greater of equal than 4. Note that in the example of VVC draft 3, a maximum number of regular coded bin budget is fixed for each coding group. Therefore, for some coefficients, only the sig_flag, gt1_flag and par_flag elements may be signaled, while for other coefficients, the gt3_flag may also be signaled. Thus the remainder value that is coded and parsed is computed relative to the already decoded flags for a considered coefficient, hence as a function of the partially decoded quantized coefficient.

8. abs_level: this indicates the absolute value of the coefficients for which no flag (among sig_flag, gt1_flag, papr_flag or gt3_flag) has been coded in the considered CG, for maximum number of regular coded bins matters. This syntax element is Rice-Golomb binarized and bypass-coded similarly to the remainder syntax element.

9. sign_flag: this indicates the sign of the non-zero coefficients. This is bypass-coded.

FIG. 7A illustrates the syntax element for the coding/parsing for a transform block according to VVC draft 4. The coding/paring comprises a 4-pass process. As can be seen, for a given transform block, the position of the last significant coefficient is first coded. Then, for each CG from the CG containing the last significant coefficient (excluded) and the first CG, the significance of the CG is signal (coded_sub_block_flag), and in case the CG is significant, the residual coding for that CG takes place, as illustrated by FIG. 7B.

FIG. 7B illustrates the CG-level residual coding syntax as specified in VVC draft 4. It signals the previously introduced syntax elements sig_flag, gt1_flag, par_flag, gt3_flag, remainder, abs_level and the sign_data in the considered CG. The figure illustrates signaling and parsing of the sig_flag, gt1_flag, par_flag, gt3_flag, remainder and abs_level syntax elements according to VVC draft 4. EP means "equi-probable", which means the concerned bins are not arithmetically coded, but are coded in by-pass mode. The by-pass mode writes/parses directly a bit, which is generally equal to the binary syntax element (bin) one wants to encode or parse.

Furthermore, VVC draft 4 specifies a hierarchical syntax arrangement from the CU-level down to the residual sub-block (CG) level.

FIG. 8A illustrates the CU-level syntax as specified in the example of VVC draft 4. It comprises signaling the coding mode of a considered CU. The cu_skip_flag signals if the CU is in merge skip mode. If not, the cu_pred_mode_flag indicates the value of variable cuPredMode, hence if the prediction mode of current CU is coded through intra prediction (cuPredMode=MODE_INTRA) or inter prediction (cuPredMode=MODE_INTER).

In case of non-skip and non-intra mode, a next flag indicates the use of the intra block copy (IBC) mode for current CU. The following of the syntax comprises the intra or inter prediction data of current CU. The end of the syntax is dedicated to the signaling of the transform tree associated to current CU. This begins by the cu_cbf syntax element, which indicates that some non-zero residual data is coded for current CU. In case this flag is equal to true, the transform_tree associated to current CU is signaled, according to the syntax arrangement illustrated by FIG. 8B.

FIG. 8B illustrates the transform_tree syntax structure of the example of VVC draft 4. It basically comprises signaling if the CU contains one or several transform units (TU). First, if the CU size is higher than the maximum allowed TU size, then the CU is divided into 4 sub-transform-tree, in a quad-tree fashion. If not, and if no ISP (Intra Sub-partition) or SBT (sub-block transform) is used for current CU, then the current transform tree is not partitioned and contains exactly one TU, which is signaled through the transform-unit syntax table of FIG. 8C. Otherwise, if the CU is intra and the ISP (Intra Sub Partition) mode is used then the CU is also split into several (actually 2) TUs. Each of the 2 TUs are successively signaled through transform-unit syntax table of FIG. 8C. Otherwise, if the CU is inter and the SBT (subblock transform) mode is used then the CU is split into 2 TUs according to the CU-level SBT related decoded syntax. Each of the 2 TUs are successively signaled through transform-unit syntax table of FIG. 8C.

FIG. 8C shows the transform unit level syntax arrangement in the example of VVC draft 4. It is made of the following. First the tu_cbf_luma, tu_cbf_cb and tu_cbf_cr flags respectively indicate that non-zero residual data is contained in each transform block in current TU, corresponding to each component. For each component, if the corresponding cbf flag is true, then the transform block level residual_tb syntax table is used to code the corresponding residual transform block. The transform_unit level syntax also includes some coded transformed and quantized block related syntax, i.e. the delta QP information (if present) and the type of transform used to code the considered TU.

Figure 9A:
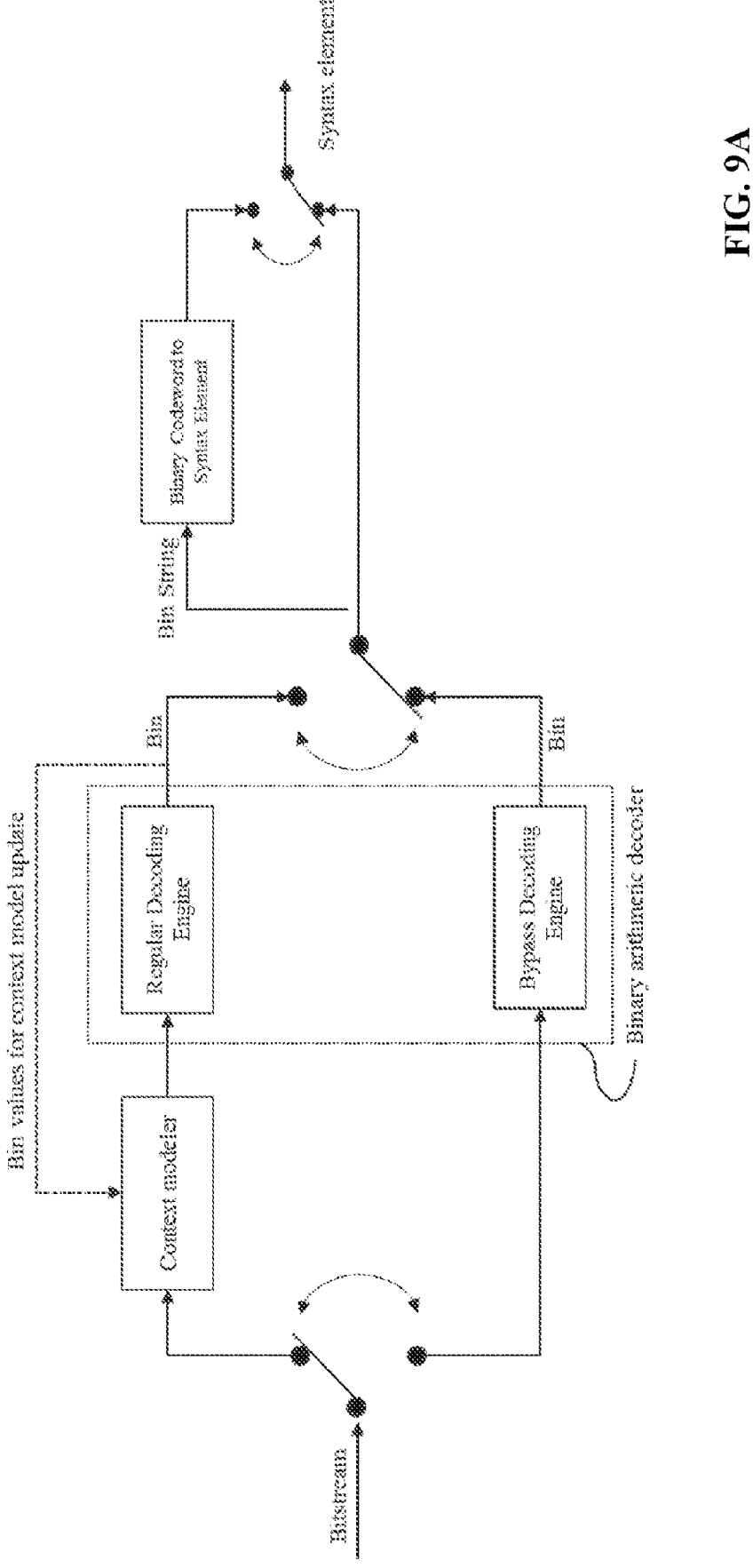
FIGS. 9A and 9B illustrate respectively the CABAC decoding and encoding processes.
Figure 9B:
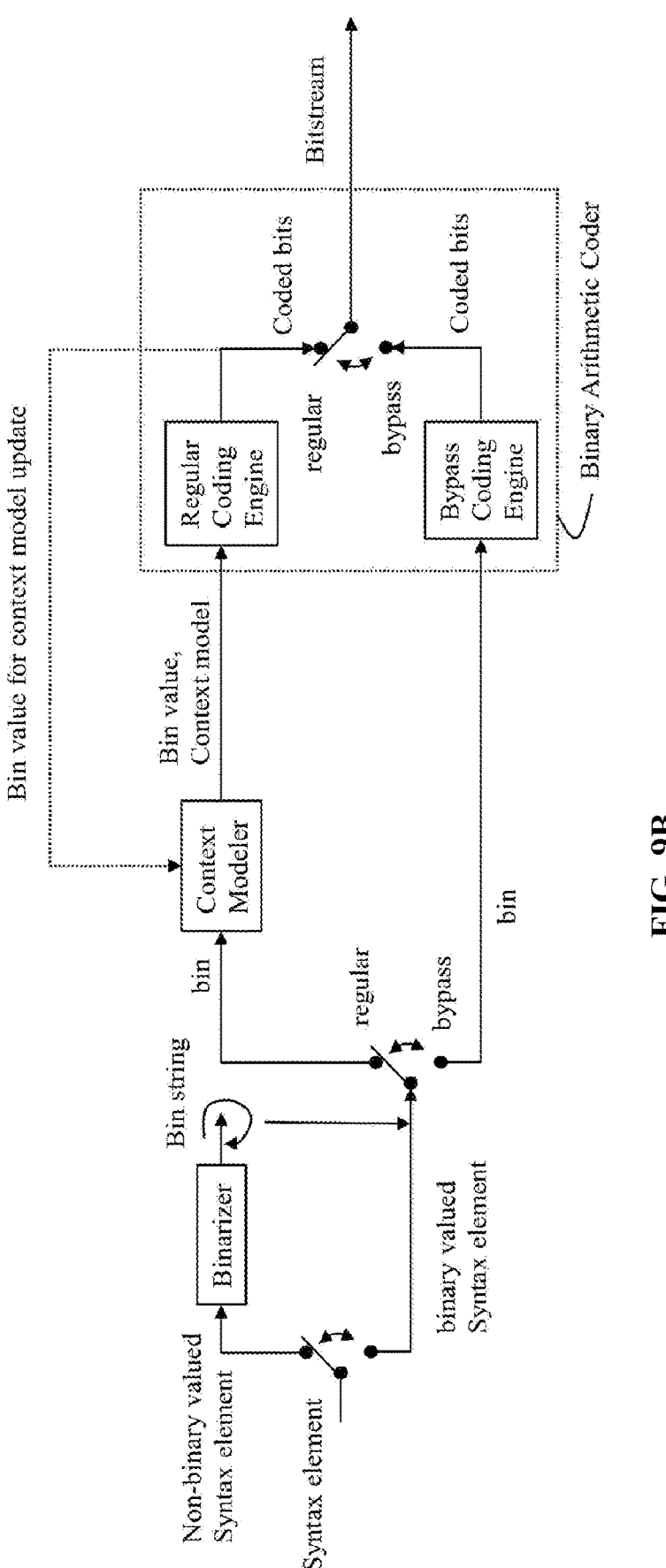

FIGS. 9A and 9B illustrate respectively the CABAC decoding and encoding processes. CABAC stands for Context-adaptive binary arithmetic coding (CABAC) and is a form of entropy encoding used in HEVC or VVC for example since it provides lossless compression with good compression efficiency. The input to the process of FIG. 9A comprises the coded bit-stream, typically conforming to the HEVC specification or a further evolution of it. At any point of the decoding process, the decoder knowns which syntax element is to be decoded next. This is fully specified in the standardized bitstream syntax and decoding process. Moreover, it also knows how the current syntax element to decoded is binarized (i.e. represented as a sequence of binary symbols called bins, each equal to '1' or '0'), and how each bin of the bin string has been encoded.

Therefore, the first stage of the CABAC decoding process (left side of FIG. 9A) decodes a series of bins. For each bin, it knows if it has been encoded according to the bypass mode or the regular mode. In bypass mode, a bit is simply read from the bit-stream and the obtained value is assigned to current bin. This mode has the advantage of being straightforward, hence fast and does not require intensive resources. It is typically efficient thus used for bins that have a uniform statistical distribution, i.e. equal probability of being equal to '1' or '0'.

On the opposite, if current bin has not been coded in bypass mode, then it means it has been coded in so-called regular coding, i.e. through context-based arithmetic coding. This mode is much more resource intensive.

In that case, the decoding of considered bin proceeds as follows. First, a context is obtained for the decoding of current bin. It is given by the context modeler of FIG. 9A. The goal of the context is to obtain the conditional probability that current bin has value '0', given some contextual prior or information X. The prior X here the value of some already decoded syntax element, available both on the encoder and decoder side in a synchronous way, at the time current bin is being decoded.

Typically, the prior X used for the decoding of a bin is specified in the standard and is chosen because it is statistically correlated with the current bin to decode. The interest of using this contextual information is that it reduces the rate cost of coding the bin. This is based on the fact that the conditional entropy of the bin given X is low as the bin and X are correlated. The following relationship is well-known in information theory:

$$H(bin|X) < H(bin)$$

It means that the conditional entropy of bin knowing X is lower than the entropy of bin if bin and X are statistically correlated. The contextual information X is thus used to obtain the probability of bin being '0' or '1'. Given these conditional probabilities, the regular decoding engine of FIG. 14 performs the arithmetic decoding of the binary value bin. The value of bin is then used to update the value of the conditional probabilities associated to current bin, knowing the current contextual information X. This is called the context model updating step on FIG. 9A. Updating the context model for each bin as long as the bins are being decoded (or coded) allows progressively refining the context modeling for each binary element. Thus, the CABAC decoder progressively learns the statistical behavior of each regular-encoded bin.

The context modeler and the context model updating steps are strictly identical operations on the encoder and on the decoder sides.

The regular arithmetic decoding of current bin or its bypass decoding, depending on how it was coded, leads to a series of decoded bins.

The second phase of the CABAC decoding, shown on right side of FIG. 9A, comprises converting this series of binary symbols into higher level syntax elements. A syntax element may take the form of a flag, in which case it directly takes the value of current decoded bins. On the other side, if the binarization of current syntax element corresponds to a set of several bins according to considered standard specification, a conversion steps, called "Binary Codeword to Syntax Element" on FIG. 9A, takes place.

This proceeds the reciprocal of the binarization step that was done by the encoder as shown in FIG. 9B. The inverse conversion performed here thus comprises obtaining the value of these syntax elements based on their respective decoded binarized versions.

The encoder 100 of FIG. 1, decoder 200 of FIG. 2 and system 1000 of FIG. 3 are adapted to implement at least one of the embodiments described below.

In the current video coding systems—for example VVC draft4—some hard constraint is imposed onto the coefficient group coding process, where a hard-coded maximum number of regular CABAC bins can be employed for sig_flag, gt1_flag and parity_flag syntax elements on one side, and for the gt3_flag syntax element on the other side. More precisely, a 4×4 coding group (or coefficient group, or CG) level constraint ensures that a maximum number of regular bins have to be parsed by the CABAC decoder engine per unit of area. However, it may lead to non-rate-distortion-optimal video compression, due to the limited use of the regular bin CABAC coding. Indeed, when a limited number of regular bins is allowed for a picture, then this overall budget may be largely under-utilized in the case where a part of the considered picture to code contains a significant area coded in skip mode (hence without any residual) while another significant area of the picture would employ residual coding. In such case, the low-level, i.e. 4×4 CG-level, constraint onto the maximum number of regular bins may lead to a total number of regular bins in the picture that is far below the acceptable picture-level threshold.

At least one embodiment relates to handling a high-level constraint on the maximum usage of regular CABAC coding of bins, in the residual coding process of blocks and their coefficient groups, so that the high-level constraint is respected and the compression efficiency is improved compared to current approaches. In other words, a budget of regular coded bins is allocated over a picture area that is larger than a CG, thus covering a plurality of CG, and which is determined from an average allowed number of regular bins per unit of area. For example, 1.75 average regular coded bins per sample may be allowed. This budget can then be distributed more efficiently over smaller units. In different embodiments, the higher level constraint is set at the transform block or transform unit or coding unit or coding tree unit or picture level. These embodiments may be implemented by a CABAC optimizer as shown in FIG. 10.

In at least one embodiment, the higher level constraint is set at the transform unit level. In such embodiment, the number of regular bins allowed for a whole transform unit to encode/decode is determined from the average allowed number of regular bins per unit of area. From the obtained budget of regular bins for the TU, the number of allowed regular bins for each transform block (TB) in the TU is derived. A transform block is set of transform coefficients belonging to a same TU and a same color component. Next, given the number of allowed regular bins in the transform block, the residual coding or decoding is applied under the constraint of this number of allowed regular bins for the whole TB. Therefore, a modified residual coding and decoding process is proposed here, which takes into account the TB-level regular bin budget, instead of the CG-level regular bins budget. Several embodiments are proposed for this purpose.

Figure 10:
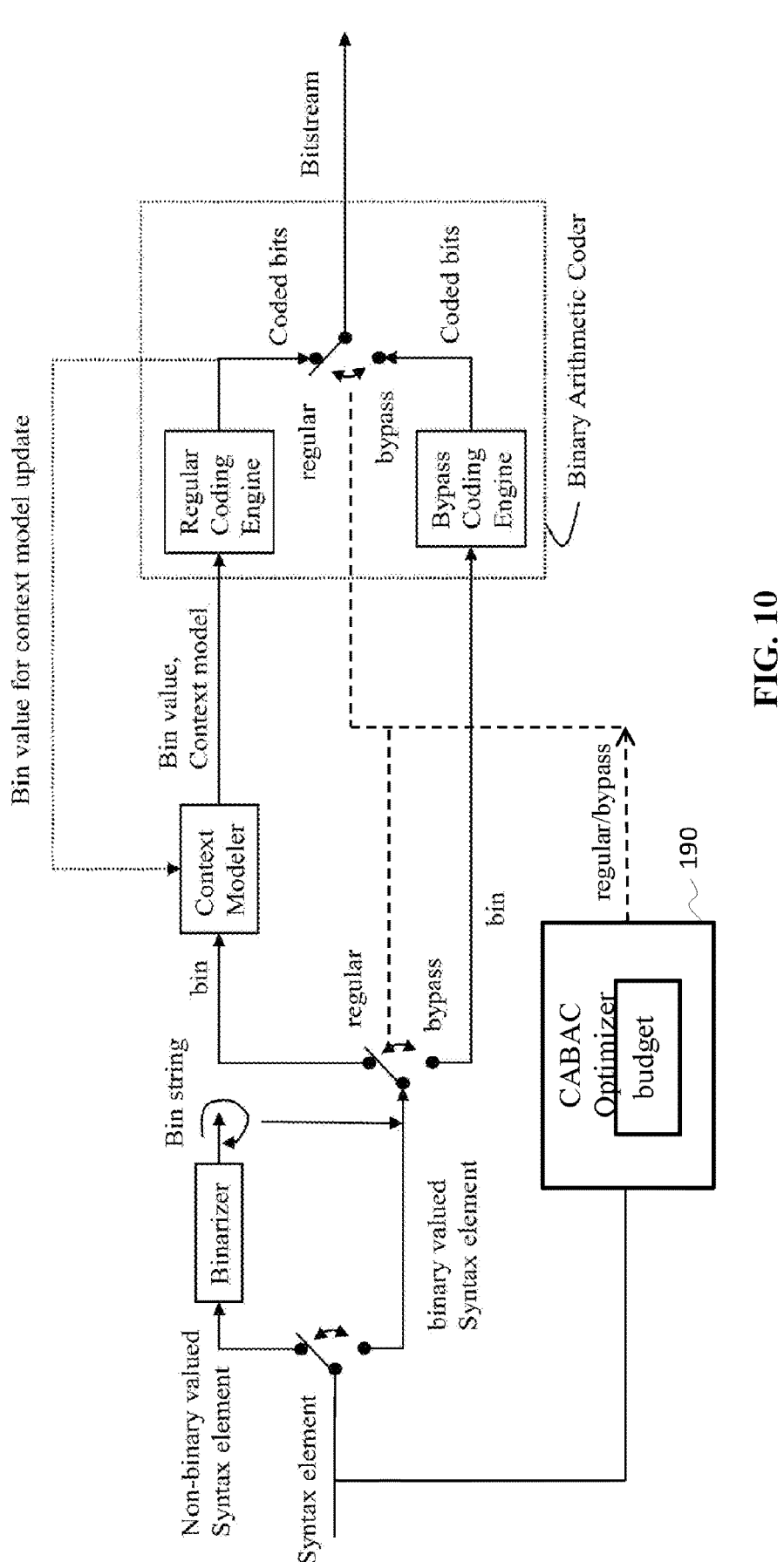
FIG. 10 illustrates a CABAC encoding process comprising a CABAC optimizer in accordance with an embodiment of the present principles.

FIG. 10 illustrates a CABAC encoding process comprising a CABAC optimizer in accordance with an embodiment of the present principles. In at least one embodiment, the CABAC optimizer 190 handles a budget representative of a maximum number of bins encoded (or to be encoded) using regular coding for a set of coding groups. This budget is determined for example by multiplying the per-sample budget of regular coded bins by the surface of the considered data unit, i.e. the number of sample contained in it. For instance, in case of a budget of regular coded bins fixed at the TB level, the allowed number of regular coded bins per sample is multiplied by the number of samples contained in the considered Transform Block. The output of the CABAC optimizer 190 controls the coding in either regular or bypass coding modes and thus greatly impacts the efficiency of the coding.

Figure 11:
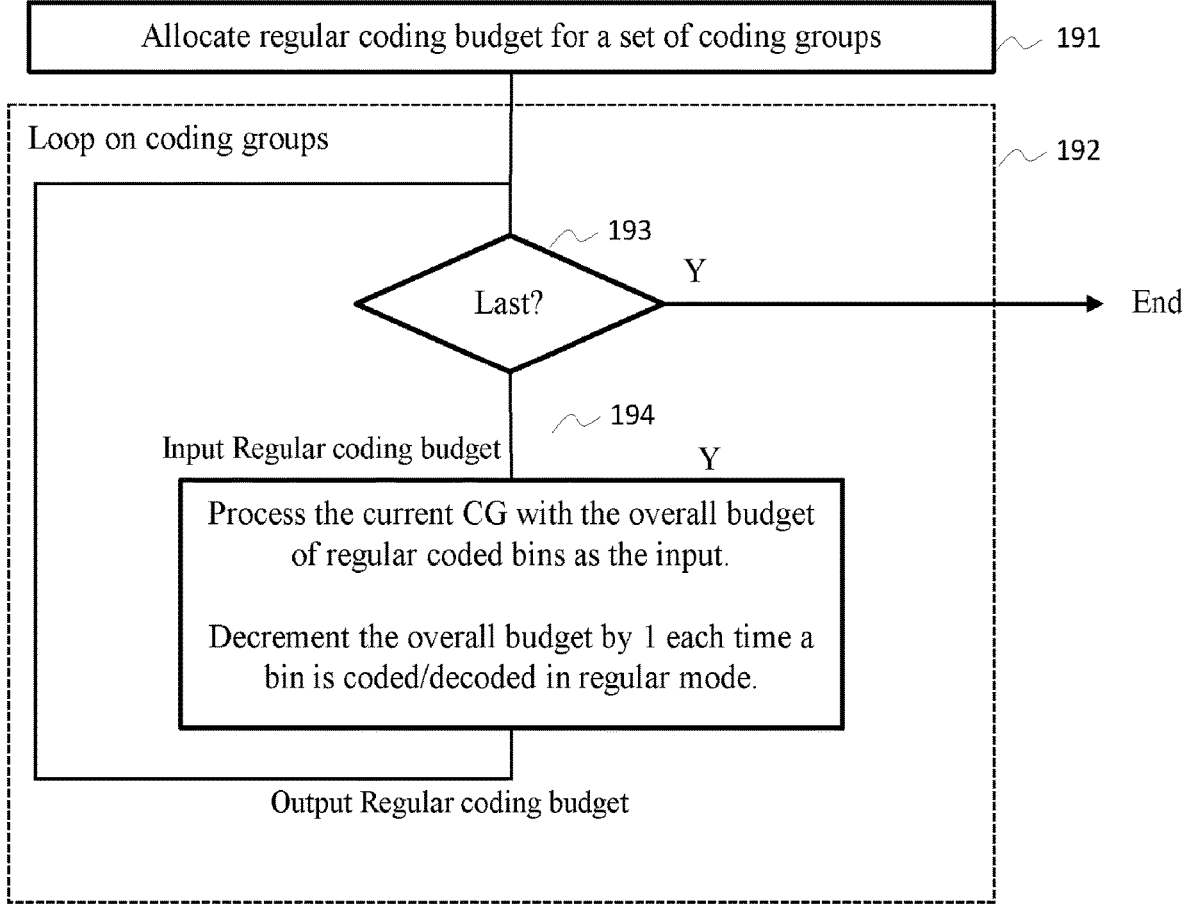
FIG. 11 illustrates an example flowchart of a CABAC optimizer used in an encoding process in accordance with an embodiment of the present principles.

FIG. 11 illustrates an example flowchart of a CABAC optimizer used in an encoding process in accordance with an embodiment of the present principles. This flowchart is executed for each new set of coding groups considered. Thus, according to different embodiments, it may occur for each picture, for each CTU, for each CU, for each TU or for each TB. In step 191, the processor 301 allocates a budget for regular coding determined as described above. In step 192, the processor 301 loops over the set of coding groups and check for reaching the last one, in step 193. In step 194, for each coding group, the processor processes the coding group with an input budget of regular coded bins. The budget of regular coded bins is being decreased during the processing of the considered coded group, i.e. it is decremented eachtime a bin is coded in regular mode. The budget of regular coded bins is returned as an output parameter of the coding group coding or decoding processes.

FIG. 12 illustrates an example of modified process for encode/decode a coding group using the CABAC optimizer. As introduced above, the allocation of a number of regular CABAC bins dedicated to residual coding is performed at a higher level than the 4×4 coding group. To do this, the process to encode/decode a coding group is modified compared to the conventional function by adding an input parameter representing the current budget of regular bins at the time the CG is being coded or decoded. This budget is thus modified by the coding or decoding of the current CG, according to the number of regular bins used to encode/decode current CG. The input/output parameter which represents the budget of regular bins is called numRegBins_in_out in FIG. 12. The process for coding the residual data itself in a given CG can be the same as conventionally, except that the number of allowed regular CABAC bins is given by an external means. Moreover, each time a regular bin is coded/decoded, this budget is decremented by one, as in the case of FIG. 12.

Thus, at least one embodiment of the present disclosure comprises processing the budget of regular bins as an input/output parameter of the Coefficient Group coding/parsing function. The budget of regular bins can therefore determined at a higher level than the CG coding/parsing level. Different embodiments propose to determine the budget at different levels: transform block or transform unit or coding unit or coding tree unit or picture level FIG. 13A illustrates an example embodiment where the budget of regular bins is determined at the transform block level. In such embodiment, the budget is determined as a function of two main parameters: the size of the current transform block and the elementary budget of regular bins fixed for a given unity of picture area. Here, the unit of area considered is the sample. In current VVC draft 2, since 32 regular bins are allowed for a 4×4 CG, it means an average of 2 regular bins per component sample is allowed. The proposed transform block level regular bins allocation is based on this average rate of regular bins per unity of area.

In at least one embodiment, the budget allocated for the considered transform block is calculated as the product of the transform block surface by the allocated number of regular per sample. Next, the budget is passed to the CG residual coding/parsing process for each significant Coefficient Group in the considered transform block.

FIG. 13B illustrates an example embodiment where the budget of regular bins is determined at the transform block level according to the position of the last significant coefficient. According to this variant embodiment, the number of allowed regular bins for the current transform block is calculated as a function of the position of the last significant coefficient in the considered transform block. The advantage of such approach is to better fit the energy contained in the considered transform block, when allocating regular bins. Typically, more bins may be allocated to high energy transform blocks and less regular bins to low energy transform blocks.

FIG. 14A illustrates an example embodiment where the budget of regular bins is determined at the transform unit level. As illustrated, the unitary budget, i.e. the average rate of allowed regular bins per sample is still equal to 2. The TU-level budget of regular bins is determined by multiplying this rate by the total number of samples contained in the considered transform unit, i.e. width*height*3/2 in the example of 4:2:0 color format. This overall budget is then used for the coding of all transform blocks contained in the considered transform unit. It is passed as an input/output parameter to the residual transform block coding/parsing process for each color component. In other words, each time a transform block in the considered transform unit is coded/parsed, the budget is decreased by the number of regular bins in the coding/parsing of transform blocks successively coded/parsed in that transform unit.

FIG. 14B illustrates an example embodiment where the budget of regular bins is to determined at the transform unit level and allocated between transform blocks as a function of the relative surface between different transform blocks, and as a function of regular bins used in already coded/parsed transform blocks in the considered transform unit. In this embodiment, the regular bins allocated to the Luma TB is two thirds of the overall TU-level budget. Next, the Cb TB budget is half of the remaining budget after the Luma TB has been coded/parsed. Finally, Cr TB budget is set to the remaining TU-level budget after the two first TBs have been coded/parsed. Furthermore, note that in a further embodiment, the budget of the overall transform unit may be shared between transform blocks in that TU based on the knowledge that one or more TB in that TU is coded with a null residual. This is known through the parsing of the tu_cbf_luma, tu_cbf_cb or tu_cbf_cr flags for example. Hence, the TB-level residual coding/parsing process is adapted to this variant embodiment as shown by the modified process illustrated in FIG. 14C. Such embodiment results into a better coding efficiency than when the budget is allocated at a lower level in the hierarchy. Indeed, if some CG or TB is of very low energy, it may employ a reduced number of bins compared to other ones. Hence, a higher number of regular bins can be used in CG or TB where a higher number of bins need to be coded/parsed.

FIG. 15A illustrates an example embodiment where the budget of regular bins is allocated at the coding unit level. It is computed similarly as for the previous TU-level fixed embodiment but based on the sample-rate of regular bins and on the CU size. The computed budget of regular bins is then passed to the transform tree coding/parsing procedure of FIG. 15B which shows the adapted coding/parsing of the transform tree associated to the current CU based on the CU-level assigned regular bins budget. Here, the CU-level is basically successively passed to the coding of each transform unit contained in the considered transform tree. Also, it is being decreased by the number of regular bins employed in the coding of each TU. FIG. 15C illustrates a variant embodiment of the coding tree coding/parsing process when the budget is fixed at the CU level. Typically, this process updates the overall CU-level budget as a function of the number of regular bins used in already coded/parsed TU, when coding a current TU in the considered transform tree. For example, in the case of the SBT (sub-block transform) mode in an inter CU, the VVC draft 4 states that the CU is split into 2 TU, and one of them has a null residual. In that case, this embodiment proposes that the entire CU-level regulars bins budget is dedicated to the TU with non-zero residual, which make the coding efficiency better for such inter CUs in SBT mode. Moreover, in the case is ISP (intra sub-partition), this VVC partitioning mode of Intra CU splits the CU in several TU. In that case, the coding/parsing of TUs tries to reuse the non-used regulars bins budget that was assigned to preceding TU in the same CU. FIG. 15D and FIG. 15E show the transform unit coding/parsing process, adapted for the present embodiment when the regular bins budget is fixed on the CU level. They consist in the respective adaptions of the processes of FIG. 14A and FIG. 14B to the present embodiment.

In at least an embodiment, the budget of regular CABAC bins used in residual coding is fixed on the CTU level. This allows to better exploit the overall budget of allowed regular bins, hence improve coding efficiency compared to previous embodiments. Typically, bins initially dedicated to skip CU may be used advantageously for other non-skip CUs.

In at least an embodiment, the budget of regular CABAC bins used in residual coding is fixed on the picture level. This allows to even better exploit the overall budget of allowed regular bins, hence improve coding efficiency compared to previous embodiments. Typically bins initially dedicated to skip CU may be used advantageously for other non-skip CUs.

In at least an embodiment, the average rate of allowed regular bins in a given picture is fixed according to the temporal layer/depth the considered picture belongs to. For instance, in the random-access coding structure, the temporal structure of a group of picture conforms to the hierarchical B pictures arrangement. In this configuration, pictures are organized in temporal scalable layers. Picture from higher layers depend on reference pictures from lower temporal layers. On the contrary, picture in lower layers do not depend on any picture in a higher layer. Higher temporal layers are typically coded with a higher quantization parameter than picture in the lower layers, hence with a lower quality. Moreover, the pictures from lower layers heavily impact the overall coding efficiency over the whole sequence. Hence it is of interest to encode these pictures with an optimal coding efficiency. According to this embodiment it is proposed to allocate a higher sample-based rate of regular CABAC bins to pictures from lower layers than to pictures from higher temporal layers.

FIG. 16A and FIG. 16B illustrate an example embodiment where the budget of regular bins is allocated at a higher level than the CG-level and to use two types of CG coding/parsing processes. A first type, shown by FIG. 16A, is called "all_bypass" and comprises coding all bins associated to the CG in bypass mode. This implies that the magnitude of transform coefficient in the CG are coded only through the abs_level syntax element. A second type, shown by FIG. 16B, is called "all_regular" and consists in coding all bins corresponding to the sig_flag, gt1_flag, par_flag and gt3_flag syntax elements in regular mode. In this embodiment, given a regular bins budget fixed at a level higher than the CG level, the TB coding process may switch between the "all_regular" CG coding mode and the "all_bypass" CG coding mode, according to whether the considered budget of regulars bins currently considered has been fully used or not.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the embodiments presented in figures FIG. 10 to FIG. 16.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the embodiments of figures FIG. 10 to FIG. 16.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. Figures FIG. 1, FIG. 2 and FIG. 3 above provide some embodiments, but other embodiments are contemplated, and the discussion of Figures does not limit the breadth of the implementations.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example regarding block sizes. The specific values are for example purposes and the aspects described are not limited to these specific values.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A video encoding method comprising:
performing a residual encoding process using a limited number of regular bins to code syntax elements representative of a picture area comprising coding groups representative of sub-blocks of quantized coefficients of a transform block;
wherein the coding is a CABAC encoding; and
wherein the number of regular bins is determined based on a budget allocated for a transform block as being equal to 1.75 multiplied by a number of samples of the transform block.

2. The method of claim 1, wherein the budget allocated is decremented each time a binary element is encoded using regular CABAC encoding mode.

3. A video decoding method comprising:
performing a residual decoding process using regular bins to parse a bitstream representative of a picture area comprising coding groups representative of sub-blocks of quantized coefficients of a transform block;
wherein the decoding is done using CABAC decoding; and
wherein the number of regular bins is determined based on a budget allocated for a transform block as being equal to 1.75 multiplied by a number of samples of the transform block.

4. The method of claim 3, wherein the budget allocated is decremented each time a binary element is decoded using regular CABAC decoding mode.

5. A video encoding apparatus comprising:
at least one processor configured for:
performing a residual encoding process using a limited number of regular bins to code syntax elements representative of a picture area comprising coding groups representative of sub-blocks of quantized coefficients of a transform block;
wherein the coding is a CABAC encoding; and
wherein the number of regular bins is determined based on a budget allocated for a transform block as being equal to 1.75 multiplied by a number of samples of the transform block.

6. The apparatus of claim 5, wherein the budget allocated is decremented each time a binary element is encoded using regular CABAC encoding mode.

7. A video decoding apparatus comprising:
at least one processor configured for:
performing a residual decoding process using regular bins to parse a bitstream representative of a picture area comprising coding groups representative of sub-blocks of quantized coefficients of a transform block;
wherein the decoding is done using CABAC decoding; and
wherein the number of regular bins is determined based on a budget allocated for a transform block as being equal to 1.75 multiplied by a number of samples of the transform block.

8. The apparatus of claim 7, wherein the budget allocated is decremented each time a binary element is decoded using regular CABAC decoding mode.

9. A non-transitory computer-readable storage medium having stored instructions that, when executed by a processor, cause the processor to perform a video encoding method comprising performing a residual encoding process using a limited number of regular bins to code syntax elements representative of a picture area comprising coding groups representative of sub-blocks of quantized coefficients of a transform block, wherein the coding is a CABAC encoding, and wherein the number of regular bins is determined based on a budget allocated for a transform block as being equal to 1.75 multiplied by a number of samples of the transform block.

10. The non-transitory computer-readable storage medium of claim 9, wherein the budget allocated is decremented each time a binary element is encoded using regular CABAC encoding mode.

11. A non-transitory computer-readable storage medium having stored instructions that, when executed by a processor, cause the processor to perform a video decoding method comprising performing a residual decoding process using regular bins to parse a bitstream representative of a picture area comprising coding groups representative of sub-blocks of quantized coefficients of a transform block, wherein the decoding is done using CABAC decoding, and wherein the number of regular bins is determined based on a budget allocated for a transform block as being equal to 1.75 multiplied by a number of samples of the transform block.

12. The non-transitory computer-readable storage medium of claim 11, wherein the budget allocated is decremented each time a binary element is decoded using regular CABAC decoding mode.

* * * * *